United States Patent [19]

Maruyama et al.

[11] Patent Number: 4,708,947

[45] Date of Patent: Nov. 24, 1987

[54] WATER RESISTANT COMPOSITION AND HEAT-SENSITIVE RECORDING SHEET CONTAINING THE SAME

[75] Inventors: Hitoshi Maruyama, Kurashiki; Isao Ono, Asakuchi; Hiroji Kohno; Junnosuke Yamauchi, both of Kurashiki; Takuji Okaya, Nagaokakyo, all of Japan

[73] Assignee: Kuraray Co., Ltd., Kurashiki, Japan

[21] Appl. No.: 815,468

[22] Filed: Jan. 2, 1986

[30] Foreign Application Priority Data

Jan. 10, 1985 [JP] Japan .................................. 60-2967
Jan. 10, 1985 [JP] Japan .................................. 60-2968
Mar. 15, 1985 [JP] Japan ................................ 60-52820
Mar. 15, 1985 [JP] Japan ................................ 60-52822

[51] Int. Cl.$^4$ ............................................. B41M 5/18
[52] U.S. Cl. ..................................... 503/209; 428/16; 503/200; 503/214; 503/226; 524/58; 524/503; 525/58
[58] Field of Search ................. 526/72; 346/200, 226, 346/209, 214; 428/15, 16; 524/58, 503; 525/58

[56] References Cited

U.S. PATENT DOCUMENTS

| | | | |
|---|---|---|---|
| 4,138,362 | 2/1979 | Vassiliades et al. | 427/151 |
| 4,415,428 | 11/1983 | Nochumson et al. | 204/299 R |
| 4,415,490 | 11/1983 | Joh | 514/25 |
| 4,576,928 | 3/1986 | Tani et al. | 502/404 |

*Primary Examiner*—Bruce H. Hess
*Attorney, Agent, or Firm*—Oblon, Fisher, Spivak, McClelland & Maier

[57] ABSTRACT

This invention relates to a water resistant composition which comprises (A) polyvinyl alcohol, (B) a chitosan of which aqueous 1% solution has a viscosity not greater than 70 centipoise at 20° C. and (C) an aldehyde compound, as well as a heat-sensitive recording sheet which comprises said composition. The composition has excellent water resistant properties and the heat-sensitive recording sheet has improved color forming properties and excellent resistance to water and solvents.

28 Claims, No Drawings

WATER RESISTANT COMPOSITION AND HEAT-SENSITIVE RECORDING SHEET CONTAINING THE SAME

BACKGROUND OF THE INVENTION

1. Field of the Invention

The present invention relates to a compositon having excellent water resistant properties, and more particularly to a water resistant composition comprising (A) polyvinyl alcohol (B) a chitosan of which aqueous 1% solution has a viscosity not greater than 70 centipoise (abbreviated as cp hereinafter) and (C) an aldehyde compound.

The present invention also relates to a heat-sensitive recording sheet, and more particularly to a heat-sensitive recording sheet having excellent water and solvent resistant properties, as well as improved color forming properties, which comprises a support having provided thereon with a heat-sensitive color forming layer, wherein (A) polyvinyl alcohol, (B) a chitosan of which aqueous 1% solution has a viscosity not greater than 70 cp at 20° c. and (C) an aldehyde compound are incorporated into, or applied onto, said heat-sensitive color forming layer.

2. Description of the Prior Art

Polyvinyl alcohol has been widely used as binders, adhesives or sizing agents for treating surfaces. It is known that polyvinyl alcohol has film-forming properties and strength which are far superior to other sizing agents, but has relatively poor resistance to water, in particular, when dried at a low temperature, because it is essentially water soluble. Various methods have been attempted to improve the water resistant properties of polyvinyl alcohol.

One known method is to cross-link polyvinyl alcohol by aldehydes, such as glyoxal, glutaraldehyde and dialdehyde starch. However, in order to make polyvinyl alcohol sufficiently resistant to water by the use of such aldehydes, the polymer must be treated at an elevated temperature, e.g., as high as 100° C., or even at a temperature higher than 120° C. for a prolonged period of time. The cross-linking of polyvinyl alcohol can be effected at a relatively low temperature if polyvinyl alcohol is dried under a strongly acidic condition, e.g., not greater than pH 2.0. In this case, however, aqueous solution of polyvinyl alcohol tends to be unstable and suffers from gelation during actual usage.

It is also known to cross-link polyvinyl alcohol by the use of tetraborates of alkali metals. Cross-linked polyvinyl alcohol obtainable by this method shows only poor resistance to water and its aqueous solution has poor stability in viscosity.

In another known method, a water insoluble film is formed from polyvinyl alcohol and an acidic acetic acid solution of a chitosan having a high polymerization degree, or from a dilute solution of polyvinyl alcohol, a chitosan having a high polymerization degree and glutaraldehyde, and the resulting film is then dipped into a strong aqueous alkali solution, thereby hydrolyzing the polyvinyl alcohol to a high degree and, at the same time, converting the ammonium groups in the chitosan, which are formed by the reaction with acetic acid, into amines, so as to make the chitosan insoluble to water (see Proc. Int. Conf. (1982), T. Uragami et al., pp. 221-226). However, this method is basically developed for preparing a membrane for dialysis in a laboratorial scale and not suited for a commercial production. This is because chitosans produced by conventional methods have a high polymerization degree or a high molecular weight in the order of hundreds of thousands, that is to say, an aqueous 1% solution of the chitosans has a viscosity greater than 500 centipoise (cp) when measured by a Brookfield viscometer at 20° C., and can be handled only in the form of a dilute solution since the viscosity of their aqueous solutions become too high when dissolved together with polyvinyl alcohol. In addition, ordinary chitosans have poor compatibility with polyvinyl alcohol and must be treated with alkali in order to be made insoluble to water.

On the other hand, heat-sensitive recording sheets comprising a support provided thereon with a colorless or lightly colored leuco dye, an electron acceptor such as a phenol compound or an organic acid, and a binder, have been widely used for facsimiles, computer terminals, printers for desktop electronic calculators, medical measuring instruments, bar code labels for POS, and the like. It is known that such heat-sensitive recording sheets can be produced by coating on a support a colorless or lightly colored lactone, such as Crystal Violet Lactone, and an acidic compound, such as a phenol compound, together with a water soluble binder.

As a water soluble binder for such heat-sensitive recording sheets, there have been used such water soluble polymers as polyvinyl alcohol, methyl cellullose, carboxymethyl cellulose, polyacrylic acid, copolymer of styrene and maleic aicd, starch, and the like. Of these polymers, polyvinyl alcohol has been most widely used because of its superior adhesive properties.

However, heat-sensitive recording sheets produced by using such water soluble binders suffer from the disadvantage that colored images formed by the intermixing and the reaction between a color-forming lactone and an acidic compound, tend to be faded or even disappeared when contacted with water or plasticizers contained in vinyl chloride polymers, e.g., for synthetic leathers, because of their instability to moisture and organic solvents.

It has been proposed to use, in order to overcome such a disadvantage, a water soluble binder together with an agent capable of imparting water resistant properties to the binder, including formalin, glyoxal, dialdehyde starch, glutaraldehyde, polyacrylamides modified with aldehydes, alkali metal salts of tetraboric acid, etc., as described in Japanese Patent Publicafion Nos. 33,117/83; 33,119/83; 33,839/83 and 30,555/84. However, it is not possible to attain satisfactory results by this method since such heat-sensitive recording sheets must be subjected, in order to make a water soluble binder, in particular polyvinyl alcohol, sufficiently resistant to water, to a heat treatment at an elevated temperature as high as 100° C. or higher than 100° C., whereas color forming reactions between the lactone compound and the acidic compound contained in the heat-sensitive sheets take place when heated at such a high temperature.

It has also been proposed to improve the water resistant properties of polyvinyl alcohol by imparting the capability of cross-linking to polyvinyl alcohol per se, as disclosed in Japanese Patent Application Laid Open Nos. 191,194/83 and 193,189/83. This method could be advantageous in that no heat treatment at a high temperature is required. However, heat-sensitive recording sheets obtainable by this method do not satisfy water and solvent resistant properties required for those to be used under severe conditions, e.g., for the POS, which has been introduced in the recent years.

SUMMARY OF THE INVENTION

In order to overcome the above-described disadvantages of polyvinyl alcohol relating to its water resistant properties, the inventors have conducted intensive studies and, as a result, have found that a composition comprising (A) polyvinyl alcohol, (B) a low molecular weight chitosan produced by a specific treatment causing a significant depolymerization of the chitosan and of which aqueous 1% solution has a viscosity not greater than 70 cp at 20° C., and (C) an aldehyde compound, show superior resistance not only to cold water but also to hot water even when it is dried or heat-treated at a relatively low temperature without alkali treatment.

The inventors have also conducted intensive studies to overcome the above-described disadvantages of heat-sensitive recording sheets and found that resistance to water and organic solvents of such recording sheets can be markedly improved by incorporating (A) polyvinyl alcohol, (B) a chitosan of which aqueous 1% solution has a viscosity not greater than 70 cp at 20° c. and (C) an aldehyde compound, into the heat-sensitive color forming layer of such recording sheets, or applying the three components to the surface of said layer, and that not only color forming properties but also preservability of color iamges of such heat-sensitive recording sheets can be additionally improved by the incorporation or application of the above three components, even when produced under ordinary conditions, without employing a treatment at an elevated temperature. The present invention has been completed as a result of the above findings.

DETAILED DESCRIPTION OF THE PREFERRED EMBODIMENT

In the first place, explanations will be given on the water resistant composition according to the present invention.

Polyvinyl alcohol to be used in the present invention can be of any type only if they are soluble to water, including unmodified polyvinyl alcohol, silyl modified polyvinyl alcohol, anion-modified polyvinyl alcohols, such as those modified with carboxyl groups, sulfonic groups and phosphoric groups, cation-modified polyvinyl alcohols, and modified polyvinyl alcohols with ethylenically unsaturated monomer units, such as ethylene, vinyl ethers having a long chained alkyl group, vinyl esters, (meth)acrylamide and alpha-olefins which are introduced by copolymerization.

There is no particular limitation for the polymerization degree of the polyvinyl alcohols to be used in the present invention. However, polyvinyl alcohol having a polymerization degree of 100 to 3000 is selected in ordinary cases. There is also no particular limitation for the degree of hydrolysis so far as being soluble in water. In ordinary cases, the degree of hydrolysis is selected from the range of from 70 to 100% by mole.

Among the polyvinyl alcohols mentioned above, a silyl-modified polyvinyl alcohol having silyl group in the molecule can be particularly useful for the present invention. Therefore detailed explanations will be given hereinbelow on a silyl-modified polyvinyl alcohol having silyl group in the molecule.

Any silyl-modified polyvinyl alcohol can be used with advantage in the present invention only if it contains silyl group in the molecule. It is however most preferable to use those having reactive substitutional groups, such as alcoxyl groups, acyloxyl groups, silanol groups and salts thereof, which may be derived by the hydrolysis of alcoxyl or acyloxyl groups.

Such silyl-modified polyvinyl alcohol can be produced by (1) introducing silyl group by post-modification into polyvinyl alcohol or modified polyvinyl acetate containing carboxyl or hydroxyl groups with the use of a silyl group-introducing agent, (2) hydrolyzing a copolymer of vinyl ester and an olefinically unsaturated monomer containing a silyl group or (3) hydrolyzing a polyvinyl ester having terminal silyl group at one end thereof, which could be prepared by polymerizing a vinyl ester in the presence of a mercaptan having a silyl group. Of these methods, the ones mentioned in (2) and (3) can be preferable in view of the easiness of commercial production, as well as the uniformity in the quality of silyl-modified polyvinyl alcohol to be produced. The introduction of silyl group by post-modification described above may be effected, e.g., by the following method. A silyl group-introducing agent is dissolved into a solvent which is unreactive to said agent, such as benzene, toluene, xylene, hexane, heptane, ether and acetone. Thereafter, powders of a polyvinyl alcohol or a modified polyvinyl acetate as described above are suspended with stirring into the above solution and allowed to react with the silyl group-introducing agent at a temperature of from room temperature to the boiling point of the silyl group-introducing agent. The product may be further subjected to a treatment to hydrolyze the vinyl acetate units by use of an alkali catalyst, etc., to give a silyl group-containing modified polyvinyl alcohol.

As examples of silyl group-introducing agent to be used for the post modification, mention may be made of halogenated organosilanes, such as trimethylchlorosilane, dimethyldichlorosilane, methyltrichlorosilane, vinyltrichlorosilane, diphenyldichlorosilane and triethylfluorosilane; organo silicon esters, such as trimethylacetoxysilane and dimethyldiacetoxysilane; organo alkoxysilanes, such as trimethylmethoxysilane and dimethyldimethoxysilane; organo silanols, such as trimethylsilanol and diethylsilanediol; aminoalkylsilanes, such as N-aminoethylaminopropyltrimethoxysilane, etc.; and organo silicon isocyanates, such as trimethylsilicon isocyanate.

The hydrolysis of copolymers of vinyl esters and olefinically unsaturated monomers containing silyl groups may be effected, e.g., by the following method. A vinyl ester and an olefinically unsaturated monomer containing a silyl group are copolymerized by the use of a radical initiator in alcohol, and then an alkali or acid catalyst is added to the alcohol solution to effect the hydrolysis of the copolymer. As an example of vinyl esters to be used in said method, mention may be made of vinyl acetate, vinyl propionate and vinyl formate. Of these vinyl esters, vinyl acetate can be most preferable from the economic point of view.

As examples of silyl group-containing olefinically unsaturated monomers to be used in the above method, mention may be made of vinyl silanes represented by the following General Formula (I) and (meth)acrylamides represented by the following General Formula (II):

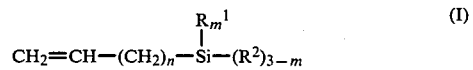
(I)

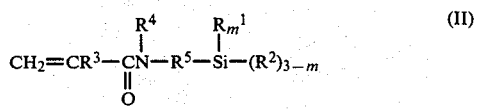

wherein n represents an integer of 0 to 4; m represents an integer of 0 to 2; $R^1$ represents an alkyl group containing 1 to 5 carbon atoms, such as methyl group and ethyl group; $R^2$ represents an alkoxyl or acyloxyl group containing 1 to 40 carbon atoms, which may be substituted with an oxygen-containing group; $R^3$ represents a hydrogen atom or a methyl group; $R^4$ represents a hydrogen atom or an alkyl group containing 1 to 5 carbon atoms; and $R^5$ represents an alkylene group containing 1 to 5 carbon atoms or a divalent organic group in which a carbon chain is interrupted by an oxygen atom or a nitrogen atom. In the case where two or more $R^1$ groups are contained in the same monomer, they may be either same or different, and in the case where two or more $R^2$ groups are contained in the same monomer, they may be either same or different.

As examples of vinylsilanes represented by General Formula (I) described above, mention may be made of vinyltrimethoxysilane, vinyltriethoxysilane, vinyltris($\beta$-methoxyethoxy)silane, vinyltriacetoxysilane, allyltrimethoxysilane, allyltriacetoxysilane, vinylmethyldimethoxysilane, vinyldimethylmethoxysilane, vinylmethyldiethoxysilane, vinyldimethylethoxysilane, vinylmethyldiacetoxysilane, vinyldimethylacetoxysilane, vinylisobutyldimethoxysilane, vinyltriisopropoxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane, vinyldimethoxylauryloxysilane, vinylmethoxydioleiloxysilane and vinyldimethoxyoleiloxysilane, as well as polyethyleneglycol-modified vinyl silane such as represented by the following general formula:

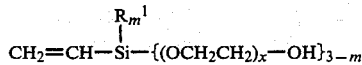

wherein $R^1$ and m have the same meanings as above; and x represents an integer of from 1 to 20.

As examples of (meth)acrylamido-alkylsilanes, represented by the general formula (II), mention may be made of 3-(meth)acrylamido-propyltrimethoxysilane, 3-(meth)acrylamido-propyltriethoxysilane, 3-(meth)acrylamido-propyltri($\beta$-methoxyethoxy)silane, 2-(meth)acrylamido-2-methylpropyltrimethoxysilane, 2-(meth)acrylamido-2-methylethyltrimethoxysilane, N-(2-(meth)acrylamido-ethyl)-aminopropyltrimethoxysilane, 3-(meth)acrylamido-propyltriacetoxysilane, 2-(meth)acrylamido-ethyltrimethoxysilane, 1-(meth)acrylamidomethyltrimethoxysilane, 3-(meth)acrylamido-propylmethyldimethoxysilane, 3-(meth)acrylamido-propyldimethylmethoxysilane, 3-(N-methyl(meth)acrylamido)-propyltrimethoxysilane, 3-((meth)acrylamido-methoxy)-3-hydroxypropyltrimethoxysilane, 3-((meth)acrylamido-methoxy)-propyltrimethoxysilane, N,N-dimethyl-N-trimethoxysilylpropyl-3-(meth)acrylamidopropylammonium chloride and N,N-dimethyl-N-trimethoxysilylpropyl-2-(meth)acrylamido-2-methylpropylammonium chloride.

Upon said copolymerization of vinyl esters and silyl group-containing olefinically unsaturated monomers to prepare silyl-modified polyvinyl alcohol to be used in the present invention, there may also be used other unsaturated monomers copolymerizable with said two components, in a small proportion. As examples of such monomers, mention may be made of styrene, alkyl vinyl ether, vinyl derivatives of versatic acids, (meth)acrylamide, olefins, such as ehtylene, propylene, alpha-hexene and alpha-octene, unsaturated acids, such as (meth)acrylic acid, crotonic acid, maleic acid (anhydride), fumaric acid and itaconic acid, and alkyl esters and alkali salts thereof, sulfonic group-containing monomers and alkali salts thereof, such as 2-acrylamido-2-methylpropanesulfonic acid, etc., and cationic monomers, such as trimethyl-3-(1-(meth)acrylamido-1,1-dimethylrpopyl)ammonium chloride, trimethyl-3-(1-(meth)acrylamidopropyl)ammonium chloride and 1-vinyl-2-methylimidazole and quaternary derivatives thereof.

The hydrolysis of polyvinyl esters having terminal silyl group at one end described hereinabove which could be prepared by polymerizing a vinyl ester in the presence of a mercaptan having a silyl group may be carried out, e.g., by the following method. A vinyl ester is allowed to polymerize by the use of a radical initiator in the presence of a mercaptan having a silyl group, which may be added to the polymerization system either at a time, portion by portion or continuously, to form a polyvinyl ester having a terminal silyl group at one end thereof, by means of chain transfer. An alkali or acid catalyst is then added to the resulting alcoholic solution to hydrolyze the polyvinyl ester, yielding a modified polyvinyl alcohol having terminal silyl group at one end to be used in the present invention.

As examples of silyl group-containing mercaptans to be used in the above preparation, mention may be made of 3-(trimethoxysilyl)-propylmercaptan and 3-(triethoxysilyl)-propylmercaptan. The above preparation of modified polyvinyl alcohol may be carried out in the presence of a small proportion of unsaturated monomers copolymerizable with the vinyl esters, such as those described hereinabove in connection with the second method of preparation.

Of the above-described methods for producing modified polyvinyl alcohol having silyl group in the molecule, the copolymerization methods are more preferable than the one by post-modification with respect to easiness for commercial production.

Among modified polyvinyl alcohols prepared via copolymerization, those prepared by a copolymerization involving a silyl group-containing olefinically unsaturate monomer represeted by General Formula (I) described hereinabove, followed by the hydrolysis thereof, can be most preferable with regard to stability in the viscosity of their aqueous solution and the stability to alkali in their aqueous alkali solutions, as well as in the water resistant properties of films prepared therefrom. On the other hand, hydrolyzed copolymerization products prepared from a silyl group-containing olefinically unsaturated monomers represented by General Formula (II) described hereinabove have excellent antifoaming properties, and films prepared therefrom have excellent barrier properties for organic solvents, although the stability in the viscosity of their aqueous solutions and the stability to alkali in their aqueous alkali solutions may somewhat a little inferior to those derived from monomers represented by General Formula (I).

The degree of modification, or the content of silyl groups, in said polyvinyl alcohols may be varied depending on their purposes. In ordinary cases, it is from 0.01 to 10% by mole, preferably from 0.1 to 5% by mole, based on monomers having silyl group in the molecule. The degree of polymerization of modified polyvinyl alcohol to be used in the present invention is, in ordinary cases, from 100 to 3000, preferabyl from 500 to 3000, irrespective of the method of their production, and the degree of hydrolysis is selected from 70 to 100% by mole.

In the present invention, there may be used chitosans containing not less than 40% of amino groups, based on the glucose units, or derivatives thereof of which amino groups are partly or wholly converted into ammonium groups with an acid. It is necessary in the present invention to use a chitosan subjected to a specific depolymerization treatment to decrease its polymerization degree to such an extent that its aqueous 1% solution has a viscosity not greater than 70 cp, preferably from 1 to 30 cp, most preferably from 1 to 10 cp, measured at 20° C. by a Brookfield viscometer.

The chitosan to be used in the present invention may be prepared, e.g., by the following methods, In one method, chitin is subjected to deacetylation by a conventional alkali treatment in a heterogeneous system to yield a chitosan, and the resulting chitosan is then subjected to an alkali, acid or peroxide treatment, so as to highly depolymerize the deacetylated product. In another method, the deacetylation and depolymerization are effected simultaneously by an alkali treatment in a homogeneous system in the good solvent for chitin, followed if necessary, by an acid or peroxide treatment.

Of the above-described chitosans, those of which amino groups are not converted to ammonium salts are generally insoluble to water. Accordingly, in order to dissolve such chitosans into water, an acid must be present in water in such an amount necessary to convert at least part of the amino groups contained in the chitosans into ammonium salts. On the other hand, chitosans of which amino groups are converted into ammonium salts, as well as those produced in the above-mentioned homogeneous system and having a content of amino groups of from 40 to 60%, are soluble in water as they are. Any acid may be used for said dissolving of the chitosans. Examples of acids usable for the purpose include acetic acid, formic acid, glycollic acid, lactic acid, benzoic acid, hydoxybenzoic acid, citric acid, fumaric acid, maleic acid, sulfamic acid, hydrochloric acid, phosphoric acid and sulfuric acid.

In the present invention, there can be used any aldehyde compounds only if they are soluble to water and maintain aldehyde groups when dissolved in water. As examples of aldehyde compounds usable in the present invention, mention may be made of monoaldehydes, such as formalin, acetoaldehyde, propionaldehyde and butyric aldehyde, polyaldehydes, such as glyoxal, glutaraldehyde and dialdehyde starch, condensation products of formalin and ammonia, such as hexamethylenetetramine, etc., methylolamides, such as dimethylolurea and N-methylolacrylamide, urea formalin resins and melamine formalin resins. Of these aldehyde compounds, glyoxal and hexamethylenetetramine can be used advantageously in view of the excellent coating properties, such as odorless and viscosity stability, of the composition comprising polyvinyl alcohol, chitosan and aldehyde compound in the present invention, as well as excellent resistance to water attainable by the use of the composition.

In the composition according to the present invention, there may be effectively used a water soluble metal salt, together with the above-described aldehyde compounds. As examples of useful water soluble metal salts, mention may be made of halides and sulfates of such metals as aluminium, iron, copper, zinc, tin, titanium, nickel, magnesium, vanadium, chrominum and zirconium. Of these metal salts, aluminium chloride, alminium sulfate, potassium alum and ammonium alum can be used with advantage because of their effects on the improvement of resistance to water.

In the composition of the present invention, the ratio by weight of (A) polyvinyl alcohol to (B) chitosan; [(A)/(B)] is from 99/1 to 10/90, preferably from 95/5 to 50/50, most preferably from 90/10 to 60/40. The ratio of weight of (A) polyvinyl alcohol and (B) chitosan to (C) aldehyde compound; {[(A)+(B)]/(C)} is from 100/1 to 100/20. In the case where the ratio [(A)/(B)] exceeds 99/1, poor resistance to water will be resulted, and where the ratio is lower than 10/90, the resulting film will not have enough strength. When the ratio {[(A)+(B)]/(C)} exceeds 100/1, poor water resistant properties will be resulted, whereas in the case where the ratio is less than 100/20, sufficient resistance to water will be unattainable and the aqueous solutions of the composition according to the present invention will have a poor stability in viscosity.

As described hereinabove, the composition of the present invention must contain (A) polyvinyl alcohol, (B) a chitosan of which aqueous 1% solution has a viscosity not greater than 70 cp at 20° C. and (C) an aldehyde compound. The composition, however, may be additionally incorporated with solvents, additives, other water soluble resins and aqueous dispersions of other polymers, depending on its use. As a solvent, water can be most preferable, but it can also be used in combination with other solvents, including alcohols, ketones, dimethylformamide, dimethylsulfoxide, and the like. As examples of additives usable in the composition, mention may be made of antifoaming agents, dispersing agents, nonionic or cationic surface acitive agents, silane coupling agents and pH adjusting agents. As examples of usable water soluble resins, metnion may be made of cellulose derivatives, such as carboxymethyl cellulose and hydroxyethyl cellulose, (meth)acrylic polymers, such as poly(meth)acrylic acids, polyhydroxy(meth)acrylates and copolymers thereof and polyacrylamides, and polyvinyl pyrrolidones and copolymers thereof.

As examples of usable aqueous dispersions of polymers, mention may be made of aqueous dispersions of polymers and copolymers of acrylic acids, copolymers of ethylene and vinyl acetate, polymers and copolymers of vinyl esters, and copolymers of styrene and butadiene.

In ordinary cases, the composition of the present invention is used in the form of a solution or dispersion dissolved or dispersed in water or in an aqueous medium containing one or more organic solvents. However, it is also possible to use the composition in such a manner that a film comprising Components (A) and (B) is formed and then Component (C) is applied thereon.

The composition of the present invention can be used with particular advantage for heat-sensitive recording sheets, making use of its excellent film-forming properties and water resistant properties, and the outstanding strength of films formed therefrom. The composition may also be used as adhesives and binders for organic and inorganic products, and vehicles for coating materials.

It is also possible to use the composition for other uses in the form of films or sheets, for which other water soluble resins have hitherto been used.

In particular, in the case where a modified polyvinyl alcohol containing silyl groups in the molecule is used, the composition of the present invention has a particularly high reactivity with inorganic substances and, at the same time, a particularly high resistance to water. In this case, the composition can be used with particular advantage in combination with inorganic pigments, as an adhesive, binder or treating agent for an inorganic substance or a material comprising inorganic substances.

The reason why the composition of the present invention has excellent film forming properties, film strength and resistance to water has not yet been fully elucidated. However, it may be presumed that the chitosans used in the composition of the present invention, particularly those giving low viscosities, are well miscible with the polyvinyl alcohol at the level of molecules, and therefore the chitosans or, the chitosans and polyvinyl alcohol can be well cross-linked upon the action of the aldehyde compounds when the composition is dried, thus resulting in the formation of a film having a high strength, as well as a high resistance to water.

In particular, in the case where a modified polyvinyl alcohol containing silyl group in the molecule is used, silyl group contained in polyvinyl alcohol, particularly those connected to an alkoxyl or acyloxyl group, as well as silanol groups or salts thereof, which may be formed by the hydrolysis of silyl groups, may have a particularly high reactivity with hydroxyl and silanol groups or salts thereof, and therefore cross-linking reactions take place between those groups with readiness. It may also be presumed that such polyvinyl alcohol is highly miscible with the chitosans, in particular those giving a low viscosity, at the level of molecules and, therefore, the polyvinyl alcohol and the chitosans are readily cross-linked with the action of the aldehyde compounds when the composition is dried, thereby forming a film having particularly high film strength and resistance to water.

Explanations will then be given on the heat-sensitive recording sheets containing a water resistant composition described above of the the present invention.

In the heat-sensitive recording sheets of the present invention, the ratio by weight of (A) polyvinyl alcohol to (B) chitosan; [(A)/(B)] is from 99/1 to 50/50, preferably from 95/5 to 60/40, more preferably from 90/10 to 60/40. The ratio by weight of (A) polyvinyl alcohol and (B) chitosan to an aldehyde compound (C); {[(A)+(B)]/(C)} is from 100/1 to 100/20. In the case where the ratio [(A)/(B)] exceeds 99/1, poor resistance to water will be resulted, and where the ratio is lower than 50/50, the viscosity of the coating solutions comprising the components tends to become too high. When the ratio {[(A)+(B)]/(C)} exceeds 100/1, poor water resistant properties will be resulted, whereas in the case where the ratio is less that 100/20, sufficient resistance to water will be unattainable and the coating solutions prepared therefrom will have a poor stability in viscosity.

As a typical example for heat-sensitive color forming components to be used in the heat-sensitive recoring sheets of the present invention, mention may be made of a combination of the following two components: (i) A color forming substance and (ii) a color developing substance capable of reacting, upon heating, with the color forming substance to generate color. As a typical example of such a color forming substance, mention may be made of lactone compounds. Any lactone compounds capable of reacting, upon heating, with an acidic compound to form color may be used in the present invention. Examples of such compounds include leuco compounds of triphenylmethane, triphenylmethanephthalide, fluoran, leuco auramine and spiropyrane series. As said color developing substances, there may be used any acidic compounds which, when heated to an elevated temperature not lower, in general, than 70° C., can be melted or vaporized to undergo rections with said leuco compounds to form color. As examples of such color developing substances, mention may be made of phenol compounds, such as 4-phenylphenol, 4-hydroxyacetophenon, 2,2'-diacetoxyphenyl, 2,2'-methylenebis(4-chlorophenol), 2,2'-methylenebis(4-methyl-6-t-butylphenol), 4,4'-isopropylidenediphenol, 4,4'-isopropylidenebis(2-chlorophenol), 4,4'-isopropylidenebis(2-methylphenol), 4,4'-sec-butylidenephenol, 4,4'-ethylenediphenol, 4,4'-ethylenebis(2-methylphenol), and the like.

As examples of supports to be used for the heat-sensitive recording sheets of the present invention, mention may be made of papers, such as high quality paper, medium quality paper and coated papers, plastic films, papers laminated with films, and fabric sheets.

Explanations will hereinafter be given on the general methods for producing heat-sensitive recording sheets of the invention, exemplifying a recording sheet in which color forming lactone compounds and phenol compounds are used.

At first, an aqueous composition containing polyvinyl alcohol, a chitosan and an aldehyde compound may be prepared by dissolving the polyvinyl alcohol and the chitosan into water or an acid-containing water or by dissolving the chitosan or a mixture of the chitosan and an acid into an aqueous solution of the polyvinyl alcohol, followed by the addition of an aldehyde compound.

A heat-sensitive recording sheet may then be prepared in accordance with the following procedure: A color forming lactone compound and a phenol compound are separately crashed into fine particles and, where desired, incorporated with fillers, such as clay, talk, mica and calcium carbonate, waxes, surface active agents, and the like. These components were dispersed or dissolved into an aqueous solution containing the polyvinyl alcohol, the chitosan and the aldehyde compound, to give a heat-sensitive coating solution. The thus prepared coating solution may be coated on a support and dried to form a heat-sensitive recording layer. If desired, a layer containing polyvinyl alcohol, a chitosan and an aldehyde compound may be additionally formed on the recording layer. It may also be effective to apply a composition according to the present invention to a support before a heat-sensitive recording layer is coated thereon.

A heat-sensitive recording sheet according to the present invention may also be prepared by the following method: A coating solution for heat-sensitive recording layer is prepared without the incorporation of polyvinyl alcohol, a chitosan and an aldehyde compound. The solution is then coated on a support which may be or may not be coated with a coating solution containing polyvinyl alcohol, a chitosan and an aldehyde compound in accordance with the prepsent invention. Onto the thus formed heat-sensitive layer is then applied a composition comprising polyvinyl alcohol, a chitosan and an aldehyde compound in accordance with the present invention.

It is also possible to use known water soluble resins, such as starch, in a raltively small amount in addition to the polyvinyl alcohol according to the present invention.

The polyvinyl alcohol, the chitosan and the aldehyde compound may be used, in the case where they are incorporated as a binder into a layer containing heat-sensitive color forming components, in an amount of from 1 to 500 parts by weight, preferably from 2 to 200 parts by weight, per 100 parts by weight of said heat color forming components. In the case where the three components of the present invention are applied onto a layer containing heat-sensitive color forming components, they are, preferably used at a coverage of solid contents of from 0.5 to 5 g/m². In this case, the three components are applied from an aqueous coating solution having a concentration of from 0.5 to 20% by weight, preferably from 2 to 15% by weight.

The heat-sensitive recording sheet of the present invention have not only markedly improved resistance to both water and organic solvents, but also excellent color forming properties. The reason why such marked effects are attained have not yet been fully elucidated, but it may be presumed as follows.

The chitosans to be used in the present invention, particularly those which form an aqueous solution having a lower viscosity, are highly miscible with the polyvinyl alcohol at the level of molecules and therefore the chitosan and polyvinyl alcohol can be well cross-linked with the action of the aldehyde compounds, thereby forming a film which is insoluble to water and functions as a highly effective barrier for organic solvents. In particular, in the case where a modified polyvinyl alcohol containing silyl group in the molecule is used, silyl group contained in polyvinyl alcohol, particularly those bonded to an alkoxyl or acyloxyl group, as well as silanol groups or salts thereof which can be formed by the hydrolysis of silyl groups, may have a particularly high reactivity with hydroxyl and silanol groups, salts thereof and inorganic fillers and, therefore, cross-linking reactions readily take place between them. It may also be presumed that such polyvinyl alcohol is highly miscible with the chitosan, in particular those giving a lower viscosity in aqueous solutions, at the level of molecules and, therefore, the polyvinyl alcohol and the chitosan, when dried to form a film, readily undergo self-condensation or cross-linking reactions with the action of the aldehyde compounds, thus forming a film which is not only insoluble in water but is capable of functioning as an effective barrier for organic solvents.

On the other hand, the modified polyvinyl alcohol has excellent properties as a dispersing medium for the color forming lactone compounds and the phenol compounds and, therefore, the two components can be incorporated or dispersed into the heat-sensitive recording layer in a more uniform state, which contributes to the improvement of the color-forming properties of the heat-sensitive recording sheets of the present invention.

The present invention will be further explained hereinbelow by examples, but it should not be construed that the invention is limited thereto. In the following examples, % (percents) and parts are based on weight unless otherwise stated.

EXAMPLE 1

Into an aqueous acetic acid solution were dissolved (A) 100 parts of polyvinyl alcohol (PVA-105 produced by Kuraray Co., Ltd.), which has a polymerization degree of 550 and a degree of hydrolysis of 98.5% by mole, and (B) 10 parts of chitosan having an amino group content of 80% of which aqueous 1% solution has a viscosity of 5 centipoise (cp) at 20° C. (measured by a Brookfield viscometer), to give an aqueous 15% solution. To this solution was added 5 parts (based on solids) of glyoxal to give a composition having the following proportions: $[(A)/(B)] = 91/9$ and $\{[(A)+(B)]/(C)\} = 100/4.5$. The resulting composition was casted and dried at 50° C. to form a sheet.

The thus obtained sheet was dipped in warm water at 40° C. for 24 hours, and the state of the film was observed. Result obtained is shown in Table 1.

EXAMPLES 2-6

Example 1 was repeated, except that polyvinyl alcohols shown in Table 1 were used in the proportions to the chitosan shown therein. Results obtained are shown in Table 1, together with the results of other examples.

COMPARATIVE EXAMPLE 1

Example 1 was repeated, except that the chitosan was not used at all. Result obtained is shown in Table 1, together with the results of other examples.

COMPARATIVE EXAMPLE 2

Example 1 was repeated, except that glyoxal was not used at all. Result obtained is shown in Table 1, together with the results of other examples.

COMPARATIVE EXAMPLES 3-4

Example 1 was repeated, except that the polyvinyl alcohol and the chitosan were used in proportions shown in Table 1. Results obtained are shown in Table 1, together with the results of other examples.

COMPARATIVE EXAMPLE 5

Example 1 was repeated, except that a chitosan of which aqueous 1% solution has a viscosity of 700 cp at 20° C. was used in place of the chitosan used in Example 1. In this case, the solution of said chitosan was highly viscous like a gel. Result obtained is shown in Table 1, together with the results of other examples. It would be understood from Table 1 that the water resistant compositions according to the present invention have excellent water resistant properties, in spite of the fact that they were dried at a relatively low temperature (50° C.).

TABLE 1

| | PVA Used* | [(A)/(B)] (by weight) | State of Sheet after Dipping |
|---|---|---|---|
| Example 1 | PVA-105 | 91/9 | Insoluble: not sticky and remained hard |
| Example 2 | PVA-117 | 95/5 | Insoluble: not sticky and remained hard |
| Example 3 | PVA-217 | 72/25 | Insoluble: not sticky and remained hard |
| Example 4 | PVA modified with carboxyl group | 60/40 | Insoluble: not sticky and remained hard |
| Example 5 | PVA modified with | 40/60 | Insoluble: not sticky and remained hard |

TABLE 1-continued

| PVA Used* | [(A)/(B)] (by weight) | State of Sheet after Dipping |
|---|---|---|
| Example 6 sulfonic acid PVA modified with cations | 20/80 | Insoluble but slightly softened |
| Comparative Example 1 PVA-105 | 100/0 | Dissolved |
| Comparative Example 2 PVA-105 | 91/9 | " |
| Comparative PVA-105 | 99.5/0.5 | " |
| Example 3 Comparative Example 4 PVA-105 | 5/95 | Insoluble but highly brittle |
| Comparative Example 5 PVA-105 | 91/9 | Almost dissolved |

*PVA used
Example 2: PVA having a polymerization degree of 1750 and a degree of hydrolysis of 98.5% by mole.
Example 3: PVA having a polymerization degree of 1750 and a degree of hydrolysis of 88% by mole.
Example 4: PVA having a carboxyl group content of 1% by mole, a polymerization degree of 1750 and a degree of hydrolysis of 88% by mole.
Example 5: PVA having a sulfonic group content of 1% by mole, a polymerization degree of 500 and a degree of hydrolysis of 98.5% by mole.
Example 6: PVA having a cationic group content of 0.5% by mole, a polymerization degree of 1750 and a degree of hydrolysis of 98.5% by mole.

EXAMPLES 7-15

Aqueous 15% solutions were prepared by dissolving into water (A) 100 parts of a modified polyvinyl alcohol containing 0.5% by mole of cationic units and having a degree of polymerization of 1750 and a degree of hydrolysis of 98.5% by mole and (B) 15 parts each of chitosan having a content of amino groups of 90% which was converted into ammonium salts with glycollic acid and of which aqueous 1% solution has a viscosity (at 20° C.) shown in Table 2. Into these aqueous solutions were added (C) aldehyde compounds shown in Table 2, and the resulting compositions were cast and dried at 50° c. to form sheets. The thus prepared sheets were dipped in water for 24 hours at 40° C., and the state of the sheets were observed. Results obtained are shown in Table 2, together with the results of other examples.

COMPARATIVE EXAMPLE 6

Example 7 was repeated, except that the amount of the aldehyde compound (glyoxal) used in the composition was reduced to one tenths of that used in Example 7. Result obtained is shown in Table 2, together with the results of other examples.

COMPARATIVE EXAMPLE 7

Example 7 was repeated, except that the amount of the aldehyde compound (glyoxal) used in the composition was increased to five times of that used in Example 7. In this case, however, the composition changed into gel shortly after the addition of glyoxal and, as a result, no sheet was obtained.

TABLE 2

| | Viscosity of Chitosan (B) (cp) | Aldehyde Compound (C) | {[(A) + (B)]/(C)} | State of Sheet After Dipping |
|---|---|---|---|---|
| Example 7 | 2 | Glyoxal | 100/5 | Insoluble: not sticky and remained hard |
| Example 8 | 2 | Glyoxal | 100/10 | Insoluble: not sticky and remained hard |
| Example 9 | 8 | Hexamethylenetetramine | 100/15 | Insoluble: not sticky and remained hard |
| Example 10 | 5 | Dialdehyde starch | 100/5 | Insoluble: not sticky and remained hard |
| Example 11 | 5 | Methylolmelamine | 100/5 | Insoluble: not sticky and remained hard |
| Example 12 | 5 | Dimethylolurea | 100/2 | Insoluble: not sticky and remained hard |
| Example 13 | 10 | Formalin | 100/10 | Insoluble: not sticky and remained hard |
| Example 14 | 15 | Glyoxal | 100/2 | Insoluble: not sticky and remained hard |
| Example 15 | 25 | Glyoxal | 100/1 | Insoluble: not sticky and remained hard |
| Comparative Example 6 | 2 | Glyoxal | 100/0.5 | Almost dissolved |
| Comparative Example 7 | 2 | Glyoxal | 100/25 | — |

EXAMPLE 16

Ninety parts of polyvinyl alcohol having a polymerization degree of 550 and a degree of hydrolysis of 88% by mole and 10 parts of the same chitosan used in Example 7 were dissolved into water to prepare 1000 parts of 10% aqueous solution. To this solution was added (i) 200 parts of clay and (ii) 5% of glyoxal (based on the total amount of the polyvinyl alcohol and chitosan). The resulting mixture was then cast and dried for one hour at 100° C. to give a sheet. The thus obtained sheet was insoluble to water even at 95° C. and remained hard.

COMPARATIVE EXAMPLE 8

Example 16 was repeated, except that chitosan was not used at all. When dipped in water, the sheet prepared by this example was dissolved within a short period of time not only at 95° C. but also at 40° C.

EXAMPLE 17

A copolymer of vinyltrimethoxysilane and vinyl acetate was hydrolyzed to give a silyl group-containing modified polyvinyl alcohol having a polymerization degree of 1300 and a degree of hydrolysis of vinyl acetate units of 98.5% by mole and containing 0.3% by mole of silyl groups (as vinylsilane units) (Component A). Into 100 parts of aqueous 10% solution of this modified polyvinyl alcohol(A) was added and dissolved 1.5 parts of chitosan(B) of which aqueous 1% solution has a viscosity of 5 cp at 20° C. and of which amino groups had been converted into ammonium salts with lactic acid (content of converted amino groups=100%), and then 1 part of 40% glyoxal was incorporated thereinto to give a composition having the following proportions: [(A)/(B)]=87/13 and {[(A)+(B)]/(C)}=100/3.5.

The resulting composition was cast and dried at 50° C. to give a sheet. The thus obtained sheet was insoluble to not only warm water (40° C.) but also to hot water (95° C.) and remained hard in both warm and hot water.

EXAMPLES 18-20

Example 17 was repeated, except that silyl group-containing modified polyvinyl alcohols having a degree of modification and a degree of polymerization shown in Table 3 were used instead of the modified polyvinyl alcohol used in the example 17. Results obtained are shown in Table 3. The sheets obtained were insoluble to both warm water (40° c.) and hot water (95° c.) and maintained good sheet condition.

TABLE 3

| | Degree of Modification (% by mol) | Degree of Polymerization | Resistance to Water | |
|---|---|---|---|---|
| | | | Hot Water (95° C.) | Warm Water (40° C.) |
| Example 18 | 0.5 | 550 | Insoluble but softened only slightly | Insoluble and remained hard |
| Example 19 | 0.2 | 1750 | Insoluble and remained hard | Insoluble and remained hard |
| Example 20 | 0.1 | 2000 | Insoluble and remained hard | Insoluble and remained hard |

EXAMPLE 21

Into an aqueous lactic acid solution were dissolved 100 parts of polyvinyl alcohol (PVA-105 manufactured by Kuraray Co., Ltd.), which has a polymerization degree of 550 and a degree of hydrolysis of 98.5% by mole, and 20 parts of chitosan having an amino group content of 99% of which aqueous 1% solution has a viscosity of 13 cp at 20° c. measured by a Brookfield viscometer, to prepare an aqueous 15% solution having a pH of 5.0. This solution is designated as Liquid A.

Eight parts of Crystal Violet Lactone, 25 parts of talc, 15 parts of stearic acid amide and a small amount of dispersants were added to water to prepare an aqueous 30% dispersion, which is designated as Liquid B.

Twenty five parts of Bisphenol A, 25 parts of talc and a small amount of dispersants were added to water to prepare an aqueous 30% dispersion, which is designated as Liquid C.

Liquid B and C were placed separately in paint shakers and throughly shaken with glass beads having a diameter of 5 mm, to pulverize and disperse them. Thirty parts of Liquid B and 30 parts of Liquid C were admixed. To this mixture was added 30 parts of Liquid A, and then 4% (solid content) (based on the polyvinyl alcohol) of 40% glyoxal to give a heat-sensitive coating solution.

This solution was coated by a wire bar on a high quality paper of 50 g/m² at a coverage after drying of 7 g/m² and dried at 50° C. The coated paper was then passed three times through calender rolls at 50° C. at a pressure of 50 kg/cm² and at a rate of 10 m/min. to give a heat-sensitive recording sheet.

The thus prepared heat-sensitive recording sheet was dipped in water at a temperature of 20° C. or 40° C. for 24 hours. The coated surface of the sheet was then rubbed with a finger and its resistance to water was rated in 5 grades. Results obtained are shown in Table 4.

The heat-sensitive recording sheet was heated and colored, and its color density was measured by a Macbeth densitometer. Thereafter, the colored surface of the sheet was brought into contact with the surface of a commercially available soft vinyl chloride film, and the thus contacted sheet and film were placed in a thermostat maintained at 45° c. for 2 days, with a plate placed thereon. The color density of the recording sheet was measured before and after the fading treatment to evaluate the fading caused by plasticizers. Results obtained are shown in Table 4, together with the results of other examples.

EXAMPLES 22-29

Example 21 was repeated, except that the contents of the polyvinyl alcohol and chitosan contained in Liquid A were changed as shown in Table 4. Results obtained are shown in Table 4, together with the results of other examples.

COMPARATIVE EXAMPLES 9-11

Example 21 was repeated, except that Liquid A having compositions shown in Table 4 was used in place of Liquid A used in Example 21.

As is shown in Table 4, the heat-sensitive recording sheets according to the present invention, have excellent resistance to both water and solvents at 20° c. and 40° c.

TABLE 4

| | PVA used(Note 1) | PVA/Chitosan | Resistance to Water(Note 2) | | Resistance to Solvent (Color Density) | |
|---|---|---|---|---|---|---|
| | | | 20° C. | 40° C. | Immediately After Color Development | After Contacted with Vinyl Chloride Film for 48 hrs. |
| Example 21 | PVA-105 | 83/17 | 5 | 4 | 1.27 | 1.25 |
| Example 22 | " | 87/13 | 5 | 4 | 1.28 | 1.26 |
| Example 23 | " | 77/23 | 5 | 4 | 1.25 | 1.20 |
| Example 24 | " | 69/31 | 5 | 3.5 | 1.22 | 1.15 |
| Example 25 | " | 65/35 | 4.5 | 3 | 1.22 | 1.13 |
| Example 26 | PVA-117 | 83/17 | 5 | 4 | 1.25 | 1.22 |
| Example 27 | KL-318 | 83/17 | 5 | 4.5 | 1.29 | 1.26 |
| Example 28 | PVA modified with sulfonic acid | 83/17 | 5 | 4.5 | 1.30 | 1.27 |
| Example 29 | PVA modified with | 83/17 | 5 | 4.5 | 1.30 | 1.26 |

TABLE 4-continued

| | PVA used(Note 1) | PVA/Chitosan | Resistance to Water(Note 2) 20° C. | 40° C. | Resistance to Solvent (Color Density) Immediately After Color Development | After Contacted with Vinyl Chloride Film for 48 hrs. |
|---|---|---|---|---|---|---|
| | cations | | | | | |
| Comparative Example 9 | PVA-117 | 100/0 | 2.5 | 1 | 1.25 | 1.07 |
| Comparative Example 10 | PVA-105 | 99.1/0.9 | 4 | 1 | 1.27 | 1.00 |
| Comparative Example 11 | " | 5/95 | 4 | 2.5 | 1.20 | 1.10 |

(Note 1)PVA-117: Polyvinyl alcohol having polymerization degree of 1750 and a degree of hydrolysis of 98.5% by mole.
KL-318: Polyvinyl alcohol modified with carboxyl groups, containing 1% by mol of carboxyl units, and having a polymerization degree of 1750 and a degree of hydrolysis of 88% by mole.
PVA modified with sulfonic acid: Modified polyvinyl alcohol containing 1% by mole of sulfonic acid units, and having a polymerization degree of 1800 and a degree of hydrolysis of 88% by mole.
PVA modified with cations: Modified polyvinyl alcohol containing 2% by mole of cationic group units, and having a polymerization degree of 1750 and a degree of hydrolysis of 98.5% by mole.
(Note 2)The resistance to water of the sheets were rated as follows.
5: Excellent 4: Good 3: Ordinary 2: Poor 1: Extremely poor

EXAMPLE 30

One hundred parts of a modified PVA (KL-118 manufactured by Kuraray Co., Ltd.), which contains 1% by mole of carboxylic acid units and has a polymerization degree of 1750 and a degree of hydrolysis of 98.5% by mole, and 15 parts of chitosan having a content of amino groups (converted into ammonium salts with lactic acid) of 99% and of which aqueous 1% solution has a viscosity of 20 cp at 20° C. were dissolved into water to give an aqueous 15% solution having a pH of 5.0. This solution is designated as Liquid A.

Thirty parts of Liquid B and 30 parts of Liquid C, which had been prepared in the same manner as in Example 21, were mixed and then added with 30 parts of Liquid A. Into the resulting mixture was incorporated 10% (based on the modified polyvinyl alcohol) of hexamethylenetetramine to give a heat-sensitive coating solution.

A heat-sensitive recording sheet was then prepared, using the above coating solution, and tested in the same manner as in Example 21. Results obtained are shown in Table 5.

COMPARATIVE EXAMPLE 12

Example 30 was repeated, except that a chitosan having an amino group content of 94% and of which aqueous 1% solution has a viscosity of 500 cp at 20° C. was used instead of the chitosan used in Example 30 for Liquid A. In this case, however, the liquid had an extremely high viscosity like a gel. Results obtained are shown in Table 5, together with the results of Example 30.

TABLE 5

| | Resistance to Water 20° C. | 40° C. | Resistance to Solvent (Color Density) Immediately after Color Development | After Contacted with Vinyl Chloride Film for 48 hrs |
|---|---|---|---|---|
| Example 30 | 5 | 4.5 | 1.28 | 1.25 |
| Comparative Example 12 | 3 | 2 | 1.20 | 1.05 |

EXAMPLE 31

Into aqueous 10% solution of PVA-117 was added 10% (based on the PVA) of chitosan having an amino group content of 99% and of which aqueous 1% solution has a viscosity of 5 cp at 20° C., and then lactic acid was added to the mixture in an amount necessary to dissolve the chitosan. The resulting solution had a pH of 5.0. To this solution was additionally added 5% (based on the PVA) of glyoxal to give a coating solution, which had the following proportions: [PVA/chitosan]=91/9 and {(PVA+chitosan)/glyoxal}=100/4.6.

The solution was coated onto a commercially available heat-sensitive paper at a coverage of solid content of 3 g/m², dried at 50° C. and treated by a calender. The resulting heat-sensitive papers were tested and evaluated in the same manner as in Example 21. Results obtained are shown in Table 6.

EXAMPLES 32-33

Example 31 was repeated, except that coating solutions additionally incorporated with 30 parts of pigments (based on PVA) shown in Table 6 were used in place of the coating solution used in Example 31. Results obtained are shown in Table 6, together with the results of other examples.

EXAMPLES 34-37

Example 32 was repeated, except that aldehyde compounds shown in Table 6 were used in place of the aldehyde compound used in Example 31. Results obtained are shown in Table 6, together with the results of other examples.

COMPARATIVE EXAMPLE 13

Example 31 was repeated, except that a coating solution containing no chitosan and prepared by mixing an aqueous 10% solution of an unmodified polyvinyl alcohol (PVA-117) with 10% (based on the polyvinyl alcohol) of glyoxal was used in place of the coating solution used in Example 31. Results obtained are shown in TAble 6, together with the results of other examples.

COMPARATIVE EXAMPLE 14

Comparative Example 13 was repeated, except that the coating solution additionally incorporated with fine silica powders in an amount of 30% (based on the polyvinyl alcohol) was used instead of the coating solution used in Comparative Example 13. Results obtained are shown in Table 6, together with the results of other examples.

COMPARATIVE EXAMPLE 15

Example 31 was repeated, except that the polyvinyl alcohol, chitosan and glyoxal were used in the following proportion: {(PVA+chitosan)/glyoxal}=100/0.5. Results obtained are shown in Table 6, together with the results of other examples.

COMPARATIVE EXAMPLE 16

Example 31 was repeated, except that the polyvinyl alcohol, chitosan and glyoxal were used in the following proportion: {(PVA+chitosan)/glyoxal}=100/25. Results obtained are shown in Table 6.

As is shown in Table 6, the heat-sensitive recording sheets according to the present invention show excellent properties in both resistance to water and resistance to solvents.

TABLE 6

| | Pigment | Aldehyde Compound | Resistance to Water 20° C. | Resistance to Water 40° C. | Resistance to Solvent (Color Density) Immediately After Color Development | Resistance to Solvent (Color Density) After Contacted with Vinyl Chloride Film for 48 hrs. |
|---|---|---|---|---|---|---|
| Example 31 | None | Glyoxal | 5 | 3.5 | 1.37 | 1.34 |
| Example 32 | Fine powders of silica | " | 5 | 4.0 | 1.35 | 1.30 |
| Example 33 | Calcium Carbonate | " | 5 | 4.0 | 1.37 | 1.35 |
| Example 34 | Fine powders of silica | Hexamethylenetetramine | 5 | 4.0 | 1.34 | 1.30 |
| Example 35 | " | Formaldehyde | 5 | 3.5 | 1.29 | 1.28 |
| Example 36 | " | Dimethylolurea | 5 | 4.0 | 1.33 | 1.31 |
| Example 37 | " | Urea formalin resin | 5 | 3.5 | 1.34 | 1.31 |
| Comparative Example 13 | None | Glyoxal | 2 | 1 | 1.31 | 1.02 |
| Comparative Example 14 | Fine powders of silica | " | 2 | 1 | 1.25 | 0.95 |
| Comparative Example 15 | None | " | 2 | 1 | 1.33 | 1.05 |
| Comparative Example 16 | None | " | 2 | 1 | 1.34 | 1.00 |

EXAMPLE 38

A copolymer of vinyltrimethoxysilane and vinyl acetate was hydrolysed to prepare a silyl group-containing modified polyvinyl alcohol containing 0.5% by mole of vinyl silane units and having a polymerization degree of 550 and a degree of hydrolysis of the vinyl acetate units of 98.5% by mole. Into an aqueous solution of p-hydroxylbenzoic acid were dissolved 100 parts of the modified polyvinyl alcohol and 20 parts of chitosan having an amino group content of 98% and of which aqueous 1% solution has a viscosity of 13 cp at 20° C., to give an aqueous 15% solution, which had a pH of 5.0. This solution is designated as Liquid A.

Eight parts of Crystal Violet Lactone, 25 parts of talc, 15 parts of stearic acid amide and a small amount of dispersants were added to water to prepare an aqueous 30% dispersion, which is designated as Liquid B.

Twenty five parts of Bisphenol A, 25 parts of talc and a small amount of dispersants were added to water to prepare an aqueous 30% dispersion, which is designated as Liquid C.

Liquids B and C were placed separately in paint shakers and shaken with glass beads having a diameter of 5 mm to throughly pulverize and disperse them, and then 30 parts of Liquid B and and 30 parts of Liquid C were admixed. To this mixture were added 30 parts of Liquid A and then 4% (solid content) (based on the modified polyvinyl alcohol) of 40% glyoxal to give a heat-sensitive coating solution.

This solution was coated by a wire bar on a high quality paper of 50 g/m$^2$ at a coverage after drying of 7 g/m$^2$ and dried at 50° C. The coated paper was then passed three times through calender rolls at 50° C. at a pressure of 50 kg/cm$^2$ and at a rate of 10 m/min. to give a heat-sensitive recording sheet.

The thus prepared heat-sensitive recording sheet was dipped in water at a temperature of 20° C. or 40° C. for 24 hours. The coated surface of the sheet was rubbed with a finger and its resistance to water was rated in 5 degrees. Results obtained are shown in Table 7.

The heat-sensitive recording sheet was heated and colored, and its color density was measured by a Macbeth densitometer. Thereafter, the colored surface of the sheet was brought into contact with the surface of a commercially available soft vinyl chloride film, and the contacted sheet and film were placed in a thermostat maintained at 40° c. for 2 days, with a weight placed thereon. The color density of the recording sheet was measured before and after the fading test to evaluate the fading caused by plasticizers contained in the vinyl chloride film. Results obtained are shown in Table 7.

EXAMPLE 39

Example 38 was repeated, except that a silyl group-containing modified polyvinyl alcohol having a polymerization degree of 1750 and a degree of hydrolysis of vinyl acetate units of 98.5% by mole and containing silyl groups at a proportion of 0.2% by mole was used instead of the modified polyvinyl alcohol used in Example 38. Results obtained are shown in Table 7.

EXAMPLE 40

Example 38 was repeated, except that a silyl group-containing modified polyvinyl alcohol having a polymerization dagree of 2000 and a degree of hydrolysis of vinyl acetate units of 98.5% by mole and containing silyl groups at a proportion of 0.1% by mole was used instead of the modified polyvinyl alcohol used in Example 38. Results obtained are shown in Table 7, together with the results of other examples.

EXAMPLE 41

A copolymer of 3-methacrylamidopropyltriethoxysilane and vinyl acetate was hydrolyzed to prepare a silyl group-containing modified polyvinyl alcohol containing 0.2% by mole of methacrylamidopropylsilane units and having a polymerization degree of 1100 and a degree of hydrolysis of the vinyl acetate units of 98.5% by mole. Into an aqueous solution of acetic acid were dissolved 100 parts of the thus prepared modified polyvinyl alcohol and 15 parts of chitosan having an amino group content of 99% and of which aqueous 1% solution had a viscosity of 20 cp at 20° C. to give an aqueous 10% solution, which had a pH of 5.0. This solution is designated as Liquid A.

Liquid B and Liquid C were prepared in the same manner as in Example 38, and 30 parts of Liquid B and 30 parts of Liquid C were mixed. To this mixture were added 30 parts of Liquid A and 10% (based on the modified polyvinyl alcohol) of hexamethylenetetramine to give a heat-sensitive coating solution.

The procedure described in Example 38 was repeated with the above coating solution. Results obtained are shown in Table 7, together with the results of other examples.

TABLE 7

| | Resistance to Water (Note 1) | | Resistance to Solvent (Color Density) | |
|---|---|---|---|---|
| | 20° C. | 40° C. | Immediately after Color Development | After Contacted with Vinyl Chloride Film for 48 hrs. |
| Example 38 | 5 | 5 | 1.43 | 1.40 |
| Example 39 | 5 | 5 | 1.44 | 1.41 |
| Example 40 | 5 | 5 | 1.37 | 1.35 |
| Example 41 | 5 | 4.5 | 1.32 | 1.25 |

(Note 1):
Resistance to water was rated in the following 5 grades.
5: Excellent
4: Good
3: Ordinary
2: Poor
1: Extremely poor As is shown in Table 7, the heat-sensitive recording sheets according to the present invention show excellent resistance not only at 20° C. but also at a relatively high temperature as high as 40° C. It would also be understood that the recording sheets according to the invention have highly excellent color forming properties and resistance to solvents.

EXAMPLE 42

A copolymer of vinyl triacetoxysilane and vinyl acetate was hydrolyzed to give a modified polyvinyl alcohol containing 0.5% by mole of vinyl silane units and having a polymerization degree of 500 and a degree of hydrolysis of vinyl acetate units of 88% by mole. Into an aqueous 10% solution of the modified polyvinyl alcohol was added 20% (based on said modified polyvinyl alcohol) of chitosan having an amino group content of 99% and of which aqueous 1% solution had a viscosity of 20 cp at 20° C. Acetic acid was then added to the mixture in such an amount necessary to dissolve the chitosan. (The resulting solution had a pH of 5.0.) Thereafter, 10% (based on the modified polyvinyl alcohol) of glyoxal was added to the solution to give a coating solution.

The thus prepared coating solution was coated on a commercially available heat-sensitive paper at a coverage of 3 g/m$^2$, dried at 50° C. and subjected to a calender treatment. The resulting heat-sensitive paper was tested and evaluated in the same manner as in Example 21. Results obtained are shown in Table 8.

EXAMPLE 43

Example 42 was repeated, except that fine powders of silica were additionally incorporated into the coating solution in an amount of 30%, based on the modified polyvinyl alcohol. Results obtained are shown in Table 8, together with the results of other examples.

EXAMPLE 44

Example 42 was repeated, except that calcium carbonate was additionally incorporated into the coating solution in an amount of 20%, based on the modified polyvinyl alcohol. Results obtained are shown in Table 8, together with the results of other examples.

EXAMPLE 45

A copolymer of vinyltriisopropoxysilane and vinyl acetate was hydrolyzed to give a modified polyvinyl alcohol containing 0.3% by mole of vinylsilane units and having a polymerization degree of 1300 and a degree of hydrolysis of vinyl acetate units of 98.5% by mole. Into an aqueous 10% solution of the modified polyvinyl alcohol was added 15% (based on the modified polyvinyl alcohol) of a chitosan having an amino group content of 100% and of which aqueous 1% solution had a viscosity of 5 cp at 20° C. Lactic acid was then added to the mixture in such an amount necessary to dissolve the chitosan. (The resulting solution had a pH of 5.0.) To this solution were added 5% (based on the modified polyvinyl alcohol) of hexamethylenetetramine and then 30% (based on the modified polyvinyl alcohol) of fine powders of silica as a pigment, to give a coating solution.

The procedure described in Example 42 was repeated, using the thus prepared coating solution. Results obtained are shown in Table 8, together with the results of other examples.

As is shown in Table 8, the heat-sensitive recording sheets according to the present invention show excellent resistance to water not only at 20° C., but also at a relatively high temperature as high as 40° C. It would also be understood that the recording sheets according to the invention have highly excellent color forming properties and resistance to solvents.

TABLE 8

| | Pigment | Aldehyde Compound | Resistance to Water | | Resistance to Solvent (Color Density) | |
|---|---|---|---|---|---|---|
| | | | 20° C. | 40° C. | Immediately after Color Development | After Contacted with Vinyl Chloride Film for 48 hours |
| Example 42 | None | Glyoxal | 5 | 5 | 1.53 | 1.52 |
| Example 43 | Fine powders of silica | " | 5 | 5 | 1.51 | 1.50 |
| Example 44 | Calcium carbonate | " | 5 | 5 | 1.56 | 1.55 |
| Example 45 | Fine powders of silica | Hexamethylenetetramine | 5 | 5 | 1.50 | 1.48 |

What is claimed is:

1. A heat-sensitive recording sheet comprising a support having provided thereon with a heat-sensitive color forming layer, wherein (A) polyvinyl alcohol, (B)

a chitosan of which aqueous 1% solution has a viscosity not greater than 70 centipoise at 20° C. and (C) an aldehyde compound are incorporated into, or applied onto, said heat-sensitive color forming layer.

2. A heat-sensitive recording sheet as claimed in claim 1, wherein said aqueous 1% solution of said chitosan (B) has a viscosity of from 1 to 30 centipoise at 20° C.

3. A heat-sensitive recording sheet as claimed in claim 2, wherein said aqueous 1% solution of said chitosan (B) has a viscosity of from 1 to 10 centipoise at 20° C.

4. A heat-sensitive recording sheet as claimed in claim 1, wherein said aldehyde compound (C) is a water soluble aldehyde compound.

5. A heat-sensitive recording sheet as claimed in claim 4, wherein said aldehyde compound (C) is one or more compounds selected from the group consisting of water soluble monoaldehydes, polyaldehydes, condensation products of amines and formalin, methylolamides, urea formalin resins and melamine formalin resins.

6. A heat-sensitive recording sheet as claimed in claim 5, wherein said aldehyde compound (C) is glyoxal or hexamethylenetetramine.

7. A heat-sensitive recording sheet as claimed in claim 1, wherein the ratio by weight of said polyvinyl alcohol (A) to said chitosan (B); [(A)/(B)] is from 99/1 to 50/50 and the ratio by weight of said polyvinyl alcohol (A) and said chitosan (B) to said aldehyde compound (C); {[(A)+(B)]/(C)} is from 100/1 to 100/20.

8. A heat-sensitive recording sheet as claimed in claim 1, wherein said polyvinyl alcohol (A) is a modified polyvinyl alcohol having silyl group in the molecule.

9. A heat-sensitive recording sheet as claimed in claim 8, wherein said modified polyvinyl alcohol (A) having silyl group in the molecule is a hydrolyzed product of a copolymer of a vinyl ester and an olefinically unsaturated monomer having silyl group in the molecule.

10. A heat-sensitive recording sheet as claimed in claim 8, wherein said modified polyvinyl alcohol (A) contains from 0.01 to 10% by mole of silyl group-containing monomer units.

11. A heat-sensitive recording sheet as claimed in claim 8, wherein said modified polyvinyl alcohol (A) contains from 0.1 to 5% by mole of silyl group-containing monomer units.

12. A water resistant composition comprising (A) polyvinyl alcohol, (B) a chitosan of which aqueous 1% solution has a viscosity not greater than 70 centipoise at 20° C. and (C) an aldehyde compound.

13. A water resistant composition as claimed in claim 12, wherein said aqueous 1% solution of said chitosan (B) has a viscosity of from 1 to 30 centipoise at 20° C.

14. A water resistant composition as claimed in claim 13, wherein said aqueous 1% solution of said chitosan (B) has a viscosity of from 1 to 10 centipoise at 20° C.

15. A water resistant composition as claimed in claim 12, wherein said aldehyde compound (C) is a water soluble aldehyde compound.

16. A water resistant composition as claimed in claim 15, wherein said aldehyde compound (C) is one or more compounds selected from the group consisting of water soluble monoaldehydes, polyaldehydes, condensation products of amines and formalin, methylolamides, urea formalin resins and melamine formalin resins.

17. A water resistant composition as claimed in claim 16, wherein said aldehyde compound (C) is glyoxal or hexamethylenetetramine.

18. A water resistant composition as claimed in claim 12, wherein the ratio by weight of said polyvinyl alcohol (A) to said chitosan (B); [(A)/(B)] is from 99/1 to 10/99, and the ratio by weight of said polyvinyl alcohol (A) and said chitosan (B) to said aldehyde compound (C); {[(A)+(B)]/(C)} is from 100/1 to 100/20.

19. A water resistant composition comprising (A) a modified polyvinyl alcohol having a silyl group in the molecule, (B) a chitosan of which an aqueous 1% solution has a viscosity not greater than 70 centipoise at 20° C. and (C) an aldehyde compound.

20. A water resistant composition as claimed in claim 19, wherein said modified polyvinyl alcohol (A) having silyl group in the molecule is a hydrolyzed product of a copolymer of a vinyl ester and an olefinically unsaturated monomer having silyl group in the molecule.

21. A water resistant composition as claimed in claim 19, wherein said modified polyvinyl alcohol (A) contains from 0.01 to 10% by mole of silyl group-containing monomer units.

22. A water resistant composition as claimed in claim 19, wherein said modified polyvinyl alcohol (A) contains from 0.1 to 5% by mole of silyl group-containing monomer units.

23. The water resistant composition of claim 19, wherein said aqueous 1% solution of said chitosan has a viscosity of from 1–30 centipoise at 20° C.

24. The water resistant composition of claim 23, wherein said aqueous 1% solution of said chitosan has a viscosity of from 1 to 10 centipoise at 20° C.

25. The water resistant composition of claim 19, wherein said aldehyde compound is a water soluble aldehyde compound.

26. The water resistant composition of claim 25, wherein said aldehyde compound is at least one compound selected from the group consisting of water soluble monoaldehydes, polyaldehydes, condensation products of amines and formalin, methylolamides, urea-formalin resins and melamine-formalin resins.

27. The water resistant composition of claim 26, wherein said aldehyde compound is selected from the group consisting of glyoxal and hexamethylenetetramine.

28. The water resistant composition of claim 19, wherein the ratio by weight, (A)/(B), of said modified polyvinyl alcohol having a silyl group in the molecule (A) to said chitosan (B) is from 99:1 to 10:99, and the ratio by weight, (A)+(B)/(C), of said modified polyvinyl alcohol having a silyl group in the molecule (A) and said chitosan (B) to said aldehyde compound (C) is from 100:1 to 100:20.

* * * * *